US011289316B2

(12) United States Patent
Nakamura

(10) Patent No.: US 11,289,316 B2
(45) Date of Patent: Mar. 29, 2022

(54) SPECTRUM DATA PROCESSING DEVICE AND ANALYZER

(71) Applicant: SHIMADZU CORPORATION, Kyoto (JP)

(72) Inventor: Yuka Nakamura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/059,759

(22) PCT Filed: May 30, 2018

(86) PCT No.: PCT/JP2018/020699
§ 371 (c)(1),
(2) Date: Nov. 30, 2020

(87) PCT Pub. No.: WO2019/229869
PCT Pub. Date: Dec. 5, 2019

(65) Prior Publication Data
US 2021/0233754 A1 Jul. 29, 2021

(51) Int. Cl.
H01J 49/00 (2006.01)

(52) U.S. Cl.
CPC ...... H01J 49/0009 (2013.01); H01J 49/0036 (2013.01)

(58) Field of Classification Search
CPC .............. H01J 49/0009; H01J 49/0036; H01J 49/0004; G01J 2003/2863; G01J 3/28; G01J 3/0264
See application file for complete search history.

(56) References Cited

U.S. PATENT DOCUMENTS 8,420,013 B1 * 4/2013 Inoue ............ G01N 27/06
422/62
8,653,447 B2 * 2/2014 Mukaibatake ..... G01N 30/7233
250/281

(Continued)

FOREIGN PATENT DOCUMENTS

JP   2014-044110 A   3/2014
JP   2014-520259 A   8/2014

OTHER PUBLICATIONS

TraceFinder 4.1 Training Manual (GC / MS Quantitative Edition), Thermo Fisher Scientific Co., Ltd., Feb. 2017, pp. 1-63.

(Continued)

Primary Examiner — David A Vanore
(74) Attorney, Agent, or Firm — Sughrue Mion, PLLC

(57) ABSTRACT

A data processing device configured to create, based on a plurality of spectra each obtained from each of a plurality of specimens containing a predetermined component at known concentrations different from one another, a calibration curve showing a relationship between a concentration of the component in the specimen and an area of a peak corresponding to the component of a spectrum of the specimen, where each of the plurality of spectra has a peak top at a position depending on a component contained in a specimen. The device includes a display unit and a peak range setting unit configured to allow an operator to set both end positions of a peak or a position of a baseline corresponding to the component included in the displayed spectrum.

6 Claims, 6 Drawing Sheets

(56) References Cited

U.S. PATENT DOCUMENTS

| | | | | |
|---|---|---|---|---|
| 2007/0150785 A1* | 6/2007 | Munetaka | ................ | G06F 11/28 714/746 |
| 2014/0106391 A1 | 4/2014 | Stauber et al. | | |
| 2014/0257712 A1* | 9/2014 | Mito | ................ | G01N 30/74 702/25 |
| 2014/0326875 A1* | 11/2014 | Asano | ................ | H01J 49/0009 250/288 |
| 2015/0247829 A1* | 9/2015 | Sumiyoshi | ................ | H01J 49/0031 250/288 |
| 2015/0268203 A1* | 9/2015 | Asano | ................ | H01J 49/005 250/288 |
| 2015/0276773 A1* | 10/2015 | Aoki | ................ | G05B 15/02 700/90 |
| 2015/0279649 A1* | 10/2015 | Yamaguchi | ................ | H01J 49/004 250/287 |
| 2016/0025691 A1* | 1/2016 | Tan | ................ | H01J 49/0036 702/23 |
| 2016/0231297 A1* | 8/2016 | Noda | ................ | G01N 30/8689 |
| 2016/0314949 A1* | 10/2016 | Asano | ................ | H01J 49/0031 |
| 2016/0363544 A1* | 12/2016 | Tagawa | ................ | G01N 23/046 |
| 2017/0067865 A1* | 3/2017 | Shimomura | ................ | G01N 30/7233 |
| 2017/0108478 A1* | 4/2017 | Tainaka | ................ | G01N 30/7233 |
| 2017/0115261 A1* | 4/2017 | Matsuo | ................ | G01N 30/86 |
| 2017/0138916 A1* | 5/2017 | Sumiyoshi | ................ | G01N 30/8696 |
| 2017/0256388 A1* | 9/2017 | Taniguchi | ................ | H01J 49/105 |
| 2019/0221411 A1* | 7/2019 | Kitano | ................ | H01J 49/009 |
| 2019/0265213 A1* | 8/2019 | Sugimoto | ................ | G01N 30/7233 |

OTHER PUBLICATIONS

Kallback, Patrik, "Development and Application of Software Tools for Mass Spectrometry Imaging", Acta Universitatis Upsaliensis Uppsala 2017, 2017, pp. 1-66.

TraceFinder User Guide Software Version 3.1 For General Analysis, Jun. 2013, pp. 488-502.

International Search Report of PCT/JP2018/020699 dated Aug. 14, 2018 [PCT/ISA/210].

Written Opinion of PCT/JP2018/020699 dated Aug. 14, 2018 [PCT/ISA/237].

* cited by examiner

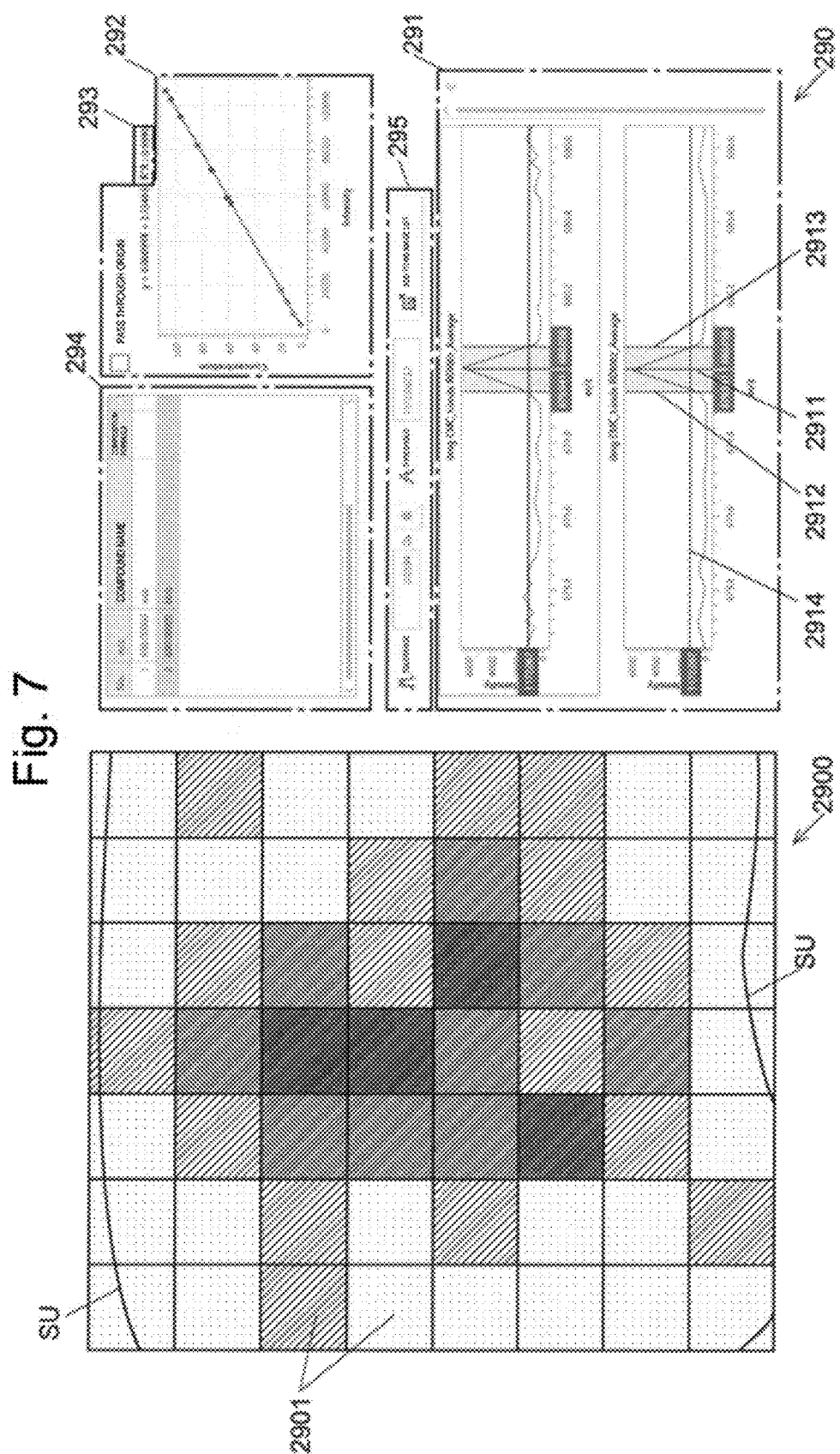

SPECTRUM DATA PROCESSING DEVICE AND ANALYZER

CROSS REFERENCE TO RELATED APPLICATIONS

This application is a National Stage of International Application No. PCT/JP2018/020699, filed May 30, 2018.

TECHNICAL FIELD

The present invention relates to a spectrum data processing device for determining the quantity of a specific component in a specimen using a spectrum having a peak top at a position depending on the component contained in the specimen, such as a mass spectrum obtained by a mass spectrometer or a spectral spectrum obtained by a spectrophotometer such as an infrared spectrophotometer or a Raman spectrophotometer, and relates to an analyzer including an analysis unit for acquiring the spectrum and the spectrum data processing device.

BACKGROUND ART

Conventionally, it has been practiced to determine the quantity of a component contained in a specimen based on a mass spectrum acquired by a mass spectrometer. For example, when a distribution of a component on a surface of a specimen such as a piece of living body tissue is to be observed, the quantity (concentration) of the component for each measurement point is obtained from a mass spectrum obtained by performing mass spectrometry on each of a plurality of measurement points (minute regions) on the surface. Mass spectrometry method for each measurement point includes, for example, a method of irradiating a measurement point with a laser and analyzing ions generated by the irradiation (see, for example, Patent Literature 1), and a method of analyzing ions generated by bringing a probe into contact with a measurement point and applying a high voltage to the probe (Patent Literature 2).

In a mass spectrum obtained by a mass spectrometer, ideally, the intensity value of ions derived from the components is obtained for each value of mass-to-charge ratios (which is formally represented by italicized "m/z"; however, will be described as non-italicized "m/z" hereinafter due to the restrictions of electronic filing). Actually, however, a peak profile having a width centered on the m/z value is obtained. For example, in a time-of-flight mass spectrometer, a mass spectrum is obtained with the time from the introduction of ions into the mass spectrometer to the detection by the detector on the horizontal axis and the detection intensity on the vertical axis. Even if a group of ions have the same value of m/z, the respective detection time of the ions varies due to the deviation in the flight direction or other factors, resulting in a peak profile having a width. In the case of such a mass spectrum, the area of a peak, rather than the height of the peak top, better reflects the quantity of the component from which the ion having m/z corresponding to the peak is derived. Therefore, by measuring the area for each peak, it is possible to determine the quantity of the component corresponding to the m/z value at the center of the peak with high accuracy.

When the quantity of a target component in a specimen is determined using a mass spectrum, usually, mass spectra of a plurality of standard specimens having known and varied concentrations of the target component are acquired before or after acquiring a mass spectrum of the objective specimen. Then, the area of the peak corresponding to the target component is obtained from each of the plurality of mass spectra, and a calibration curve showing the relationship between the concentrations and the areas is created. From the mass spectrum obtained for the specimen to analyze, the area of the peak corresponding to the target component is measured and applied to the calibration curve, whereby the concentration of the target component in the specimen is obtained.

CITATION LIST

Patent Literature

Patent Literature 1: JP 2014-520259 A
Patent Literature 2: JP 2014-044110 A

SUMMARY OF INVENTION

Technical Problem

Since a peak profile of the mass spectrum has a width as described above, the both end positions of the peak along the horizontal axis (m/z) (hereinafter referred to as both end positions) must be determined when measuring the area of the peak. Also, the baseline of the mass spectrum must be determined to eliminate the effects of background noise. These both end positions and the baseline may be automatically determined by a computer. However, they cannot always be determined appropriately when, for example, a peak due to an impurity overlap, and both end positions and a baseline may have to be determined manually in some time. If manual determination is adopted when creating a calibration curve, try-and-error operations for moving the both end positions and/or the baseline and establishing a calibration curve need to be repeated until suitable both end positions and baseline are found, which is time-consuming.

So far, the case of a mass spectrum has been described as an example, but the same problem occurs when a calibration curve is created from a spectrum other than the mass spectrum such as a spectral spectrum.

The problem to be solved by the present invention is to provide a spectrum data processing device, a data processing device for a mass spectrometer, and a mass spectrometer including the data processing device for a mass spectrometer capable of easily setting the correct both end positions and baseline of a peak of the spectrum when creating a calibration curve used for determining the quantity of the component in a specimen using the spectrum having a peak top at a position depending on the component contained in the specimen, such as a mass spectrum obtained by a mass spectrometer or a spectral spectrum obtained by a spectrophotometer.

Solution to Problem

The spectrum data processing device according to the present invention, which has been made to solve the above problems, is a device configured to create, based on a plurality of spectra each obtained from each of a plurality of specimens containing a predetermined component at known concentrations different from one another, a calibration curve showing a relationship between a concentration of the component in the specimen and an area of a peak corresponding to the component of a spectrum of the specimen, where each of the plurality of spectra has a peak top at a position depending on a component contained in a specimen, the device including:

a) a display unit having a spectrum display region and a calibration curve display region;

b) a spectrum display controller configured to display one or more of the spectra in the spectrum display region;

c) a peak range setting unit configured to allow an operator to set both end positions of a peak or a position of a baseline corresponding to the component included in the displayed spectrum;

d) a peak range determination unit configured to determine the both end positions of the peak or the position of the baseline according to a predetermined standard;

e) an area calculation unit configured to calculate an area of the peak based on the both end positions of the peak and the position of the baseline set by the peak range setting unit or determined by the peak range determination unit; and f) a calibration curve creation unit configured to create a calibration curve based on the area of the peak calculated by the area calculation unit and a known concentration of the peak and display it in the calibration curve display region.

In the spectrum data processing device according to the present invention, the spectrum display controller displays, in the spectrum display region, one or more of spectra, such as mass spectra or spectral spectra, having a peak top at a position depending on a predetermined component contained in the specimen obtained from a plurality of specimens (standard specimens) containing a predetermined component at known concentrations different from one another. For the peak corresponding to the component included in the spectrum displayed in the spectrum display region, the peak range setting unit allows an operator to set both end positions of the peak or the position of the baseline. Here, the operator may set only one of the both end positions of the peak and the position of the baseline, or may set both. When the operator sets only one of them, the peak range determination unit determines the one not set by the operator according to a predetermined standard. Alternatively, the peak range determination unit first determines the both end positions of the peak and the position of the baseline according to a predetermined standard, and the peak range setting unit, when the operator changes one or both of them to an arbitrary position, may set it to the change position.

For example, the peak range setting unit superimposes and displays marks (lines, symbols, etc.) indicating the both end positions of the peak or/and the position of the baseline on the spectrum displayed in the spectrum display region by the spectrum display controller. Then, by having the operator perform an operation of moving the mark with an input device such as a mouse or a touch panel, the both end positions of the peak and the position of the baseline can be set. Alternatively, it is possible to have the operator input numerical values indicating the both end positions of the peak and the position of the baseline.

The area calculation unit calculates the area of the peak corresponding to the component based on the both end positions of the peak and the position of the baseline thus input by the operator or determined by the peak range determination unit. Then, the calibration curve creation unit creates a calibration curve based on the calculated area of the peak and the known concentration of the peak, and displays it in the calibration curve display region.

By the above operation, the spectrum and the calibration curve are displayed on the same display unit (the spectrum display region and the calibration curve display region of the display unit), so that the operator can change the both end positions of the peak and the position of the baseline while seeing the calibration curve. In addition, each time the operator inputs the both end positions of the peak corresponding to the component or the position of the baseline, a calibration curve is created based on those positions and displayed in the calibration curve display region, so that there is no need to perform operations to recreate the calibration curve each time they are changed to find appropriate both end positions of the peak or position of the baseline. Therefore, the correct both end positions and baseline position can be easily set.

In the spectrum data processing device according to the present invention, it is desirable that, the area calculation unit calculates the area of the peak each time the both end positions of the peak or the position of the baseline are set by the peak range setting unit or determined by the peak range determination unit, and the calibration curve creation unit creates the calibration curve each time the area calculation unit calculates the area of the peak, and displays it in the calibration curve display region.

As a result, the created (changed) calibration curve is automatically displayed each time the operator sets the both end positions of the peak or the position of the baseline, which makes the operation easier. In particular, when the operator sets the positions of them by moving the mark indicating the both end positions of the peak or the position of the baseline, the display of the calibration curve is updated moment by moment as the mark is moved, so the operator can search for the optimum both end positions of the peak and baseline position while moving the mark, which makes it easier to set the positions.

In the spectrum data processing device according to the present invention, it is desirable that, the display unit has a matching degree display region for displaying a matching degree between an area calculated by the area calculation unit and the concentration corresponding to the area, and the calibration curve, and the device further includes a matching degree calculation unit configured to calculate the matching degree and display it in the matching degree display region each time the calibration curve is created by the calibration curve creation unit.

As a result, the matching degree is displayed in the matching degree display region each time the calibration curve is created by the calibration curve creation unit, that is, each time the both end positions of the peak or the position of the baseline is input. The operator can determine whether the both end positions of the peak or the position of the baseline of the input target component is appropriate based on the displayed matching degree. As the matching degree, a correlation coefficient, a square value of the correlation coefficient, or the like can be used.

It is desirable that the spectrum display controller further displays a mark (feature display) on the peak corresponding to the component in the spectrum to be displayed in the spectrum display region. This makes it clear which peak the operator should set the both end positions of the peak and the position of the baseline, which makes the operation easier. For example, the spectrum display controller identifies a peak whose peak top is located within a predetermined range from a value (m/z of a mass spectrum, or a wavelength, a wave number, a frequency, etc. of a spectral spectrum) input by the operator in advance as a peak corresponding to the component in the spectrum and can mark the peak. Alternatively, the values of various components are stored as a database in advance, and the peak corresponding to the component may be identified by using the value acquired from the database based on the name or the like of the component input by the operator.

In the spectrum data processing device according to the present invention, it is desirable that, the display unit has a distribution image display region for displaying the distribution of the concentration of the component obtained from the spectrum obtained at each of a plurality of positions in the specimen to be analyzed, and the device can be configured to further include, an intra-specimen position information acquiring unit configured to acquire, for the spectrum obtained at each of the plurality of positions, an intra-specimen position at which the spectrum is obtained;

a component quantifying unit configured to obtain a concentration of the component by applying the area of the peak calculated by the area calculation unit to a calibration curve for the spectrum obtained at each of the plurality positions each time the calibration curve is created by the calibration curve creation unit; and a distribution image display controller configured to display information on the concentration at a position in the distribution image display region corresponding to the position for the spectrum obtained at each of the plurality of positions each time the concentration is obtained by the component quantifying unit.

Information on the concentration can be represented by, for example, different colors or difference in brightness depending on the concentration. Alternatively, the information on the concentration can be also represented by a three-dimensional view in which the position is represented two-dimensionally on the base plane and the concentration is represented by the height.

With such a configuration, each time a calibration curve is created by the calibration curve creation unit (that is, each time the both end positions of the peak or the position of the baseline is set by the peak range setting unit or determined by the peak range determination unit), a distribution image showing the distribution of the concentration of the component to be analyzed in the specimen to be analyzed is displayed. As a result, when the operator changes the both end positions of the peak or the position of the baseline, not only the calibration curve is automatically changed, but also the distribution image is also automatically changed, and the analysis result based on the changed calibration curve can be obtained immediately.

The spectrum data processing device according to the present invention can be suitably used when performing mass spectrometry, spectroscopic analysis, or the like on each of the plurality of measurement points (minute regions) described above, but if the operation of creating a calibration curve is performed using the spectrum of a standard specimen having a known concentration, the present invention can be applied without limitation to the above example.

The analyzer according to the present invention includes:

a) an analysis unit configured to acquire a spectrum having a peak top at a position depending on a component contained in a specimen; and b) a spectrum data processing device that creates, based on a spectrum obtained by the analysis unit from each of a plurality of specimens containing a predetermined component at known concentrations different from one another, a calibration curve showing a relationship between a concentration of the component in each specimen and an area of a peak corresponding to the component of the spectrum of the specimen, the device including, b-1) a display unit having a spectrum display region and a calibration curve display region, b-2) a spectrum display controller configured to display one or more of the spectra in the spectrum display region, b-3) a peak range setting unit configured to allow an operator to set both end positions of a peak or a position of a baseline corresponding to the component included in the displayed spectrum, b-4) a peak range determination unit configured to determine the both end positions of the peak or the position of the baseline according to a predetermined standard, b-5) an area calculation unit configured to calculate an area of the peak based on the both end positions of the peak and the position of the baseline set by the peak range setting unit or determined by the peak range determination unit, and b-6) a calibration curve creation unit configured to create a calibration curve based on the area of the peak calculated by the area calculation unit and the known concentration of the peak and display it in the calibration curve display region.

Advantageous Effects of Invention

According to the present invention, when creating a calibration curve to be used when determining the quantity of a component in a specimen using a spectrum, it is possible to easily set correct both end positions of a peak and baseline of the spectrum.

BRIEF DESCRIPTION OF DRAWINGS

FIG. 7 is a figure showing an example which displays a distribution image representing a distribution of a concentration of a component in a specimen together with the calibration curve creation screen.

DESCRIPTION OF EMBODIMENTS

Embodiments of a spectrum data processing device and an analyzer according to the present invention will be described with reference to FIGS. 1 to 7. In the following, a case where data processing is performed on a mass spectrum obtained by a mass spectrometer will be described as an example, but the same spectrum data processing device can be used also when data processing is performed on a spectral spectrum obtained by a spectroscopic device.

Figure 1:
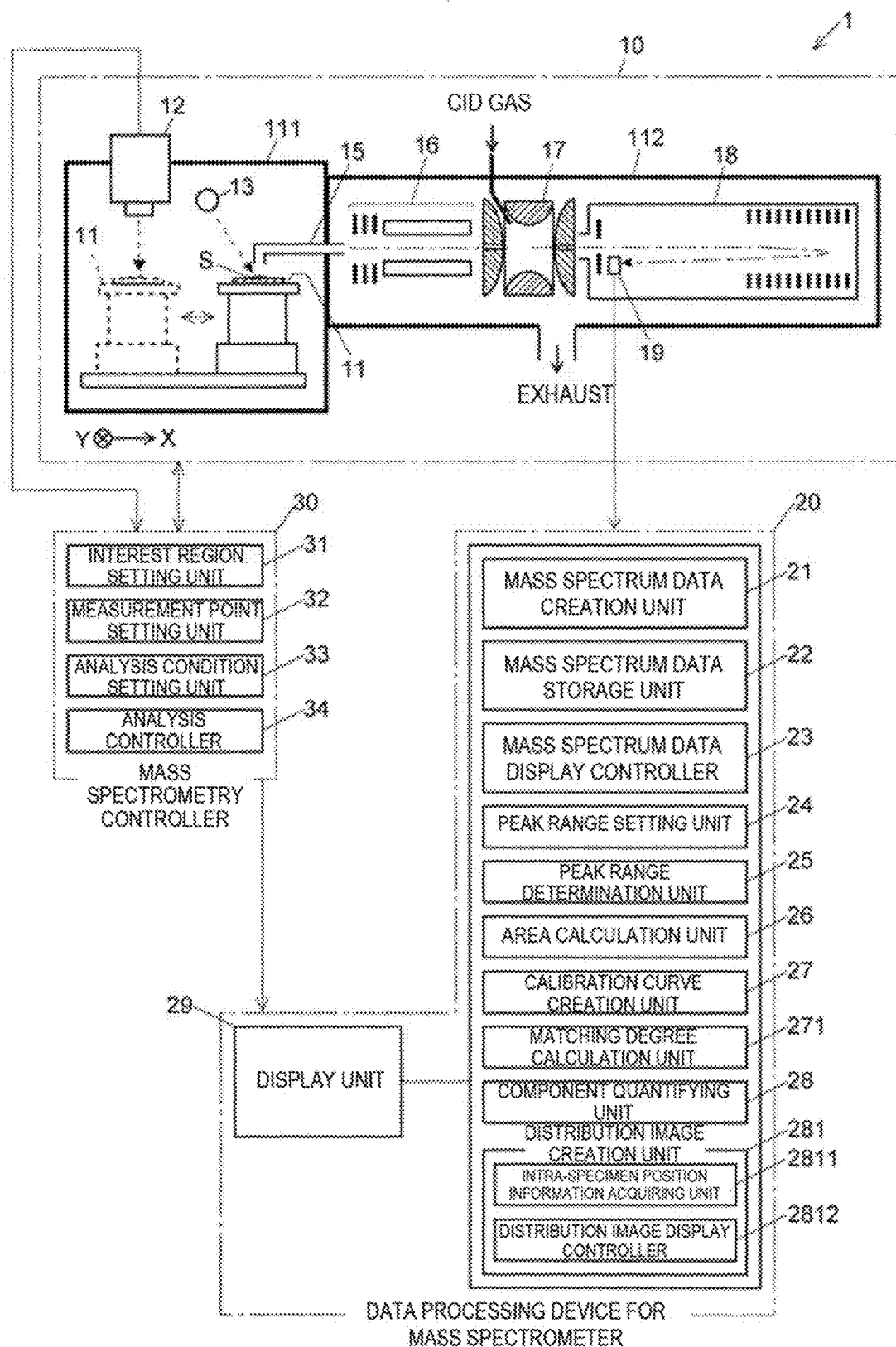
FIG. 1 is a schematic diagram showing a whole configuration of a mass spectrometer according to the present invention including a data processing device for the mass spectrometer according to the present invention.

FIG. 1 is a schematic diagram showing the whole configuration of a mass spectrometer 1 which is an analyzer of the present embodiment. The mass spectrometer 1 includes a mass spectrometry unit 10, a data processing device 20 for a mass spectrometer, which is the spectrum data processing device of the present embodiment, and a mass spectrometry controller 30 configured to control the mass spectrometry unit 10. Hereinafter, the configuration and operation of the mass spectrometer 1 will be described with a focus on the data processing device 20 for the mass spectrometer.

(1) Configuration of Mass Spectrometer 1

In the present embodiment, the mass spectrometry unit 10 uses one that performs mass spectrometry on each of a plurality of measurement points on a specimen surface. The mass spectrometry unit 10 has an ionization chamber 111 which is an atmospheric pressure atmosphere and a vacuum chamber 112 which is maintained in a vacuum atmosphere. Inside the ionization chamber 111, a specimen table 11 that can move in the biaxial directions of the X-axis and the Y-axis that are orthogonal to each other, an image acquiring unit 12 configured to acquire an optical image of a specimen S placed on the specimen table 11 when the specimen table 11 is at an optical observation position which is a position indicated by a broken line in FIG. 1, and a laser irradiation unit 13 configured to ionize a component in the specimen S by irradiating the specimen S with a laser beam having a minute diameter when the specimen table 11 is at an analysis position which is a position indicated by a solid line in FIG. 1 are arranged. The ionization chamber 111 and the vacuum chamber 112 are connected by an ion feed unit 15 configured to collect ions generated from the specimen S inside the ionization chamber 111 and convey the ions into the vacuum chamber 112. Inside the vacuum chamber 112, an ion guide 16 configured to converge and guide the ions generated from the specimen S, an ion trap 17 configured to temporarily capture the ions by a high-frequency quadrupolar electric field and perform selection of precursor ions and dissociation (collision-induced dissociation; CID) of the precursor ions as necessary, a flight tube 18 forming inside a flight space in which ions emitted from the ion trap 17 are separated in accordance with m/z, and a detector 19 configured to detect ions and transmit a detection signal to the outside are arranged.

The data processing device 20 for a mass spectrometer mainly performs a process of creating a calibration curve based on mass spectrum data obtained by the mass spectrometry unit 10 from each of a plurality of specimens containing a predetermined component at known concentrations different from one another, and also determines the quantity of the component contained in an unknown specimen based on the mass spectrum data obtained by the mass spectrometry unit 10 from the unknown specimen whose concentration of the component is unknown and the created calibration curve.

The data processing device 20 for a mass spectrometer includes a mass spectrum data creation unit (spectrum data creation unit) 21, a mass spectrum data storage unit (spectrum data storage unit) 22, a mass spectrum display controller (corresponding to the spectrum display controller) 23, a peak range input unit 24, a peak range determination unit 25, an area calculation unit 26, a calibration curve creation unit 27, a matching degree calculation unit 271, a component quantifying unit 28, a distribution image creation unit 281, and a display unit (display) 29. The display unit 29 displays a calibration curve creation screen 290 (FIG. 2) having a mass spectrum display region (corresponding to the spectrum display region) 291 for displaying one or more mass spectra, a calibration curve display region 292 for displaying a calibration curve, a matching degree display region 293 for displaying a matching degree, a compound (component) data display region 294, and a peak range input/display region 295, and other screens.

The mass spectrum data creation unit 21 receives the detection signal from the detector 19 and creates mass spectrum data showing the relationship between m/z converted from the flight time of ions and the intensity of the detection signal. The mass spectrum data storage unit 22 stores the mass spectrum data created by the mass spectrum data creation unit 21. The mass spectrum display controller 23 displays one or more of the mass spectra whose data is stored in the mass spectrum data storage unit 22 in the mass spectrum display region 291 of the calibration curve creation screen 290. The mass spectrum data creation unit 21 and the mass spectrum display controller 23 are embodied by a central processing unit (CPU) and software, and the mass spectrum data storage unit 22 is embodied by a storage device such as a memory or a hard disk.

The peak range setting unit 24 allows the operator to set the both end positions of the peak or the position of the baseline included in the one or more mass spectra displayed in the mass spectrum display region 291 of the calibration curve creation screen 290. The peak range setting unit 24 is embodied by an input device such as a mouse, a keyboard, and a touch panel, and a CPU and software that process data input by the input device.

In the present embodiment, the setting of the both end positions of the peak and the position of the baseline is performed as follows: the peak range setting unit 24 displays, in the mass spectrum display region 291, a center position mark 2911 representing the center position of the peak to be analyzed, two both end position marks 2912 and 2913 representing one end and the other end of the peak, and a baseline mark 2914 representing the position of the baseline, and then the operator moves the both end position mark 2912 or 2913, or the baseline mark 2914 using the mouse, touch panel, or the like. Here, the center position mark 2911 is set at the m/z position corresponding to the component by the operator selecting the component to be analyzed in the compound (component) data display region 294. When either of the both end position marks 2912 and 2913 is moved, the other position mark moves to its symmetric position with respect to the center position mark 2911. The center position mark 2911, the both end position marks 2912 and 2913, and the baseline mark 2914 are all represented by straight lines in the present embodiment, but may be represented by arrows, triangle marks, or other symbols.

When the both end position mark 2912 or 2913 or the baseline mark 2914 is moved, the peak range setting unit 24 changes, accordingly, the value of the peak width displayed in the peak width numerical input/display field 2951 in the peak range input/display region 295 and the value of the baseline displayed in the baseline numerical input/display field 2952. Further, the operator can also directly input the value into the peak width numerical input/display field 2951 or the baseline numerical input/display field 2952 using a keyboard or the like. In this case, the peak range setting unit 24 moves the position of the both end position mark 2912 or 2913 or the baseline mark 2914 according to the input value. Here, instead of directly inputting the numerical values of the both end positions of the peak, the position of the center of the peak and the value of the width of the peak or the half value of the same width may be input so that the both end positions of the peak are indirectly input. That is, the value obtained by subtracting the half value of the peak width from the value of m/z at the center position of the peak is the position of one end of the peak, and the value obtained by adding the half value of the peak width to the value of m/z at the center position of the peak is the position of the other end of the peak.

Note that, the baseline may be constant regardless of the value on the horizontal axis (that is, m/z) of the mass spectrum, or may be set differently depending on the value. In the latter case, for example, the baseline can be a straight line inclined with respect to the horizontal axis of the mass spectrum. Further, the baseline may be the same for all peaks appearing in the mass spectrum, or may be set differently for each peak.

When the peak range setting unit 24 sets the both end positions of the peak or the position of the baseline, the peak range determining unit 25 determines the set positions as the both end positions of the peak or the position of the baseline. However, if they are not set, the both end positions of the peak or the position of the baseline is determined based on a predetermined standard. The peak range determination unit 25 is embodied by a CPU and software. The both end positions of the peak and the position of the baseline determined by the peak range determination unit 25 are superimposed and displayed on the mass spectrum displayed in the mass spectrum display region 291.

The area calculation unit 26 calculates the area of the peak based on the both end positions of the peak and the position of the baseline set by the peak range setting unit 24 or determined by the peak range determination unit 25. The area calculation unit 26 is embodied by a CPU and software.

The calibration curve creation unit 27 creates a calibration curve based on the area of the peak calculated by the area calculation unit 26 and the concentration value of the component corresponding to the peak in the specimen for which the mass spectrum including the peak is acquired. The calibration curve is displayed in the calibration curve display region 292. The calibration curve creation unit 27 is embodied by a CPU and software. Here, the operator is made to input the concentration value when performing mass spectrometry in the mass spectrometry unit 10, and then the calibration curve creation unit 27 reads out the value stored in the mass spectrum data storage unit 22 together with the mass spectrum data at the time of creating the calibration curve. Instead, it is possible to have the operator input a concentration value at the time of creating the calibration curve. The calibration curve is created by approximating the relationship between the concentrations and the area values of the peaks obtained from a plurality of specimens having different concentrations with a predetermined function (typically, a linear function). In the calibration curve display region 292, both a straight line of the function which is a calibration curve and points representing the relationship between the area values of the peaks calculated by the area calculation unit 26 and the concentrations are displayed. A deviation occurs between the straight line and the points also due to a measurement error or the like, but if the both end positions of the peak and the position of the baseline are not set appropriately, this deviation becomes large. A check box 2921 is displayed in the calibration curve display region 292, and when the operator checks this check box 2921, a calibration curve is created so as to pass through the origin, and if not checked, a calibration curve is created regardless of whether it passes through the origin.

The matching degree calculation unit 271 calculates the matching degree between the area of the peak calculated by the area calculation unit 26 and the concentration corresponding to the area, and the calibration curve created by the calibration curve creation unit 27, and displays it in the matching degree display region 293. The matching degree calculation unit 271 is embodied by a CPU and software. The matching degree is a numerical value of the above-mentioned deviation, and a correlation coefficient, a square value of the correlation coefficient, or the like can be used. For example, the squared value of the correlation coefficient becomes one when the points indicating the relationship between the calculated area of the peak and the concentration and the calibration curve completely match, and becomes closer to zero as the deviation between the two increases. The matching degree is an index for determining whether the both end positions of the peak or the position of the baseline of the input target component is appropriate, and it is also possible to make a similar determination based on the deviation between a straight line and points displayed in the above-mentioned calibration curve display region 292. Therefore, there is no problem even if the display of the matching degree is omitted.

The component quantifying unit 28 determines a concentration of the component in the specimen from which the mass spectrum was acquired by applying the area of the peak corresponding to the component for which the calibration curve is created, which is calculated by the area calculation unit 26 from the mass spectrum stored in the mass spectrum data storage unit 22 to the calibration curve created by the calibration curve creation unit 27. The component quantifying unit 28 can determine the quantity of the component in an unknown specimen.

The distribution image creation unit 281 includes an intra-specimen position information acquiring unit 2811 and a distribution image display controller 2812. The intra-specimen position information acquiring unit 2811 acquires, for a spectrum obtained at each of a plurality of positions, position information in the specimen for which each spectrum was obtained. The position information in the specimen may be automatically identified from the optical image acquired by the image acquiring unit 12, or may be input by the operator. The distribution image display controller 2812 displays, for the spectrum obtained at each of the plurality of positions, information on the concentration at a position in the distribution image display region 296 (described later) corresponding to the position acquired by the intra-specimen position information acquiring unit 2811 each time the concentration is obtained by the component quantifying unit 28.

The mass spectrometry controller 30 includes an interest region setting unit 31, a measurement point setting unit 32, an analysis condition setting unit 33, and an analysis controller 34. The interest region setting unit 31 causes the operator to set a region of interest, which is a region to be subjected to mass spectrometry, on the surface of the specimen S placed on the specimen table 11. The measurement point setting unit 32 sets points (minute regions) to be measured at predetermined intervals within the set region of interest. The analysis condition setting unit 33 sets various analysis conditions when executing mass spectrometry according to the input by the operator. The analysis controller 34 controls the operation of each constituent element of the mass spectrometry unit 10 based on various set analysis conditions. The analysis condition setting unit 33 and the analysis controller 34 are not directly related to the configuration related to the creation of the calibration curve, which is a feature of the present invention, and are the same as those possessed by a normal mass spectrometer, and therefore detailed description is omitted.

(2) Operation of Mass Spectrometer 1

The operation of the mass spectrometer 1 of the present embodiment will be described.

(2-1) Operation of Mass Spectrometry Unit 10 and Mass Spectrometry Controller 30

Figure 3:
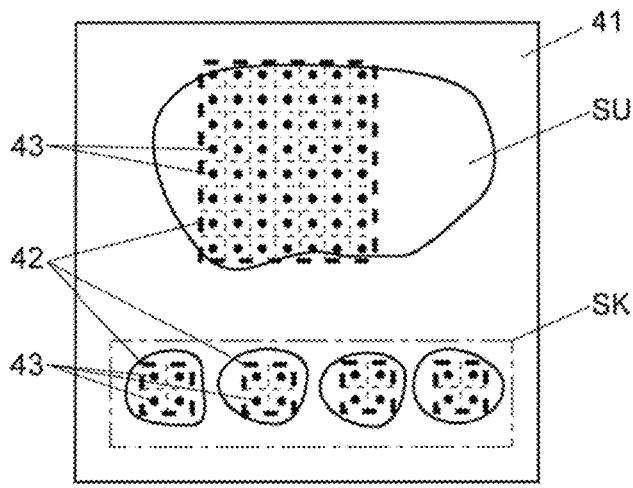
FIG. 3 is a figure showing a state in which an unknown specimen whose concentration of a predetermined component is unknown and a known specimen whose concentration is known are attached to an upper surface of a specimen plate.
Figure 4:
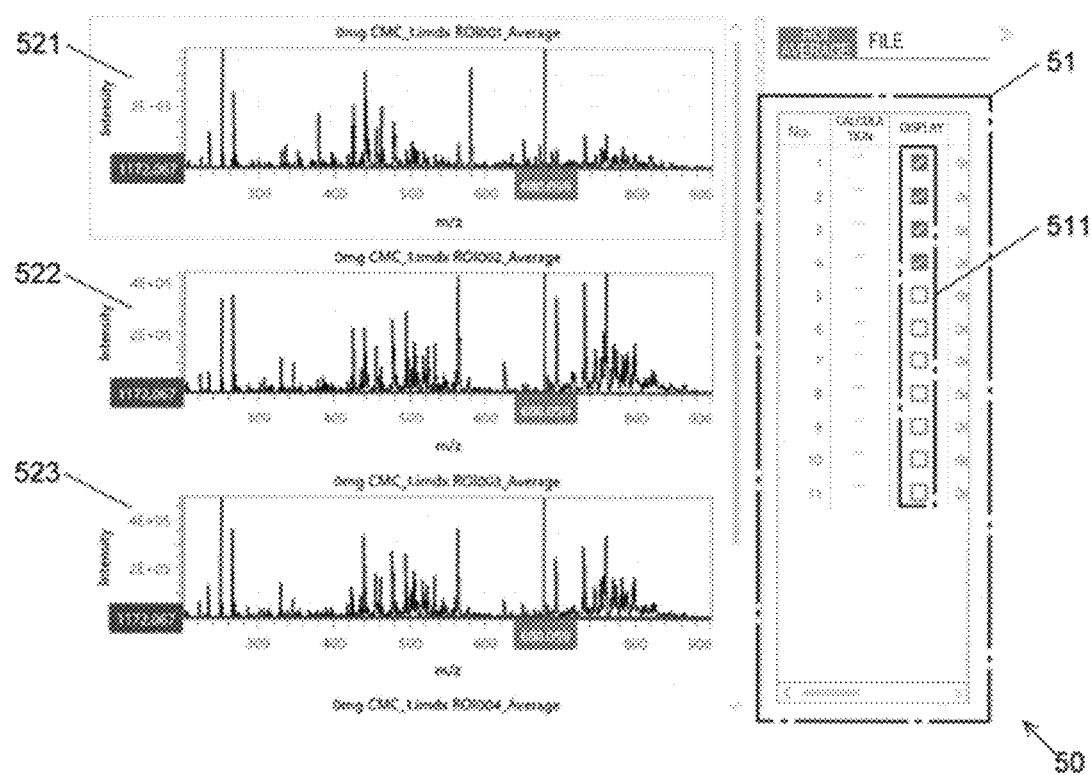
FIG. 4 is a figure showing an example of a spectrum selection screen for an operator to select a spectrum (mass spectrum) used for creation of a calibration curve.

First, as shown in FIG. 3, the operator attaches an unknown specimen SU whose concentration of a predetermined component is unknown and a plurality of known specimens (standard specimens) SK whose concentrations of the component are known but whose concentration values are different to an upper surface of a specimen plate 41, and places this specimen plate 41 on the specimen table 11. Next, when the operator performs a predetermined operation using an input device to move the specimen table 11 to the optical observation position, the image acquiring unit 12 photographs the upper surface of the specimen plate 41 and displays an enlarged image of the upper surface of the specimen plate 41 on the display unit 29. The interest region setting unit 31 sets a region of interest 42 on the surface of each of the unknown specimen SU and the plurality of known specimens SK by an operation such as the operator dragging the mouse on the image displayed on the display unit 29. The measurement point setting unit 32 divides the set region of interest 42 into a plurality of minute regions having a predetermined size, and sets a measurement point 43 at the center of each minute region. Note that, the size of the minute region may be set by the operator.

Further, before or after the operation up to this point, the analysis condition setting unit 33 causes the operator to input various analysis conditions for executing the mass spectrometry. Such analysis conditions include, for example, the power of the laser beam emitted from the laser irradiation unit 13, the number of pulse irradiations (if the laser beam is a pulse laser), the voltage applied to the ion transport optical system, the collision energy during OD, the CID gas pressure, and the like. These analysis conditions can be input by the operator selecting from a plurality of method files in which different analysis conditions are recorded.

After setting the measurement point 43, the operator moves the specimen table 11 to the analysis position by performing a predetermined operation using the input device. The analysis controller 34 moves the specimen table 11 so that one of the measurement points 43 is arranged on the extension of the laser beam emitted from the laser irradiation unit 13, and then causes the laser irradiation unit 13 to irradiate the measurement point 43 with a laser beam. As a result, a part of the specimen present at the measurement point 43 is ionized, and the generated ions are conveyed into the vacuum chamber 112 through the ion feed unit 15, converged by the ion guide 16 and fed into the ion trap 17, and are temporarily held by the action of a quadrupolar electric field. The ions are ejected from the ion trap 17 at a predetermined timing, fed into the flight space in the flight tube 18, fly through the flight space, and reach the detector 19. While flying through the flight space, the ions are separated according to m/z and reach the detector 19 in ascending order of m/z. The detector 19 detects the arrival ion and transmits a detection signal to the data processing device 20 for the mass spectrometer.

After the operation from the irradiation of the laser beam to the detection of ions at one measurement point 43 is completed, the analysis controller 34 moves the specimen table 11 so that another measurement point 43 is arranged on the extension of the laser beam, and then performs the above-described operation from the irradiation of the laser beam to the detection of ions. By repeating this operation, the measurement is performed for all the measurement points 43 of the unknown specimen SU and the plurality of known specimens SK.

(2-2) Operation of Data Processing Device 20 for Mass Spectrometer

Upon receiving the detection signal from the detector 19, the mass spectrum data creation unit 21 creates mass spectrum data for each measurement point 43. The mass spectrum data storage unit 22 stores the mass spectrum data created for each measurement point 43. Here, for the unknown specimen SU, it is necessary to store the mass spectrum for each measurement point 43 in order to obtain the quantity (concentration) of the component for each measurement point. On the other hand, since the purpose of the known specimen SK is to be used for creation of a calibration curve, it is not necessary to determine the quantity (concentration) of the component for each measurement point. For example, the mass spectrum data creation unit 21 creates one mass spectrum (average mass spectrum) by averaging the obtained intensity values for each m/z at a plurality of measurement points of one known specimen SK. Then, the mass spectrum data storage unit 22 can store the average mass spectrum. Alternatively, a mass spectrum may be created and stored using the intensity values for m/z obtained from any one of the pluralities of measurement points of one known specimen SK. It is preferable to use the average mass spectrum in order to improve the accuracy of the calibration curve. The operations up to this point are executed following the operations of the mass spectrometry unit 10 and the mass spectrometry controller 30.

When the operator performs a predetermined operation using the input device, the data processing device 20 for the mass spectrometer starts the operation of creating the calibration curve. First, the mass spectrum display controller 23 displays, on the display unit 29, a mass spectrum selection screen 50 (FIG. 4) for the operator to select a mass spectrum used for creation of the calibration curve from the mass spectrum (may be an average mass spectrum, and the same applies below) stored in the mass spectrum data storage unit 22. On the mass spectrum selection screen 50, a spectrum list 51 showing a list of mass spectra stored in the mass spectrum data storage unit 22 is displayed. In the spectrum list 51, the file name and other information of each mass spectrum are displayed, and also a check box 511 is displayed. When the operator checks the check box 511, the checked mass spectra 521, 522, 523 . . . are displayed in the mass spectrum selection screen 50. Each time the operator performs a check operation or an uncheck operation, the mass spectrum to be checked is displayed or deleted. In addition, in FIG. 4, while the check box 511 has four checks, only three mass spectra are shown, but by moving a scroll bar, another mass spectrum is displayed (instead, the mass spectrum 521 displayed at the top is hidden), and the total number of displayed mass spectra is four, which is the same as the number of checks in the check box 511.

When the operator performs a predetermined operation after the selection of the mass spectrum is completed, the calibration curve creation screen 290 (FIG. 2) is displayed on the display unit 29. At that time, in the mass spectrum display region 291, each of one or more mass spectra selected on the mass spectrum selection screen 50 is displayed in an enlarged range of m/z near the peak corresponding to the component to be analyzed. Further, in each mass spectrum in the mass spectrum display region 291, the center position mark 2911 is displayed as a vertical line in the center of the peak to be analyzed, and the both end position marks 2912 and 2913 are displayed as vertical lines at positions equidistant to the left and right from the center position mark 2911, and the baseline mark 2914 is also displayed. The center position mark 2911 is set at a position of m/z corresponding to the component by the operator selecting the component to be analyzed in the compound (component) data display region 294. When the operator changes the component to be analyzed in the data display region 294, the positions of the peak (m/z range near the peak) and the center position mark 2911 displayed in the mass spectrum display region 291 are also changed. The both end position marks 2912 and 2913, and the baseline mark 2914 are displayed as temporary positions at the initial stage at positions corresponding to the values determined by the peak range determination unit 25 based on a predetermined standard.

The area calculation unit 26 calculates the area of the peak based on the both end positions of the peak and the position of the baseline, which are the temporary positions, and then the calibration curve creation unit 27 creates a temporary calibration curve and displays it in the calibration curve display region 292. In the present embodiment, together with the graph of the calibration curve, a function (a linear function in the example shown here) formula indicating the calibration curve is also displayed. Further, the matching degree calculation unit 271 calculates the matching degree between the area of the peak and the concentration calculated by the area calculation unit 26, and the calibration curve created by the calibration curve creation unit 27, and displays it in the matching degree display region 293. Note that, the both end position marks 2912 and 2913, the baseline mark 2914, the calibration curve graph and function formula, and the matching degree may not be displayed at the first stage, but may be displayed only after the following operations by the operator are performed.

Figure 2:
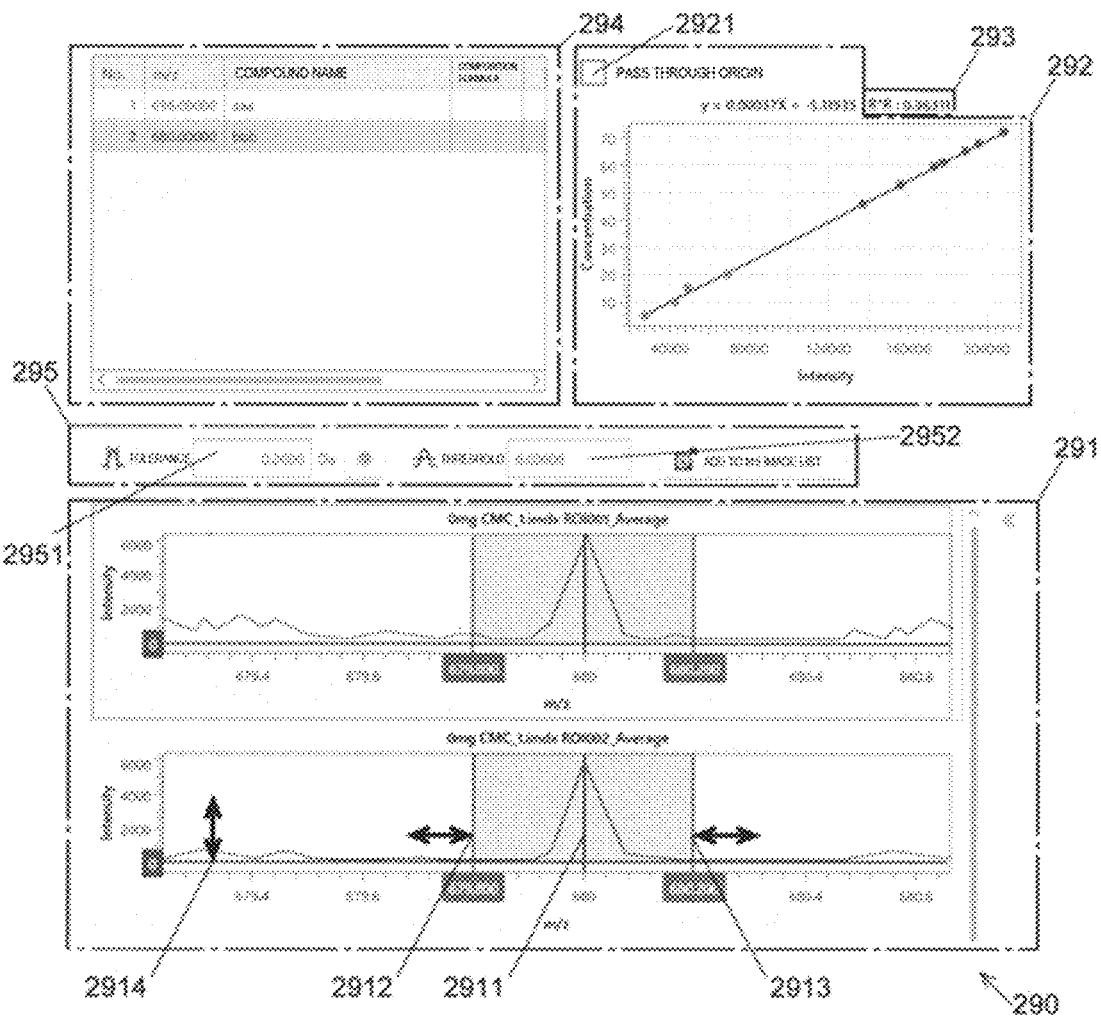
FIG. 2 is a figure showing an example of a calibration curve creation screen displayed on a display unit of the data processing device for the mass spectrometer of the present embodiment.

In this state, by the operation of the peak range setting unit 24, the operator can use the mouse to move the both end position mark 2912 or 2913 displayed in the mass spectrum display region 291 in the horizontal axis direction and the baseline mark 2914 in the vertical axis direction, respectively (thick arrow in FIG. 2). Here, in a case where a plurality of mass spectra are displayed in the mass spectrum display region 291, when the operator moves the both end position mark 2912 or 2913 or the baseline mark 2914 in one of the mass spectra, in conjunction with this, the peak range setting unit 24 also moves the both end position mark 2912 or 2913 or the baseline mark 2914 displayed in other mass spectra. Further, the peak range setting unit 24 displays so that when the operator moves one of the both end position marks 2912 and 2913, the other also moves to its symmetric position with respect to the center position mark 2911. The peak range setting unit 24, as these marks move, changes the value of the peak width (total width) displayed in the peak width numerical input/display field 2951, and the value (threshold value) of the baseline displayed in the baseline numerical input/display field 2952.

Further, the operator can also input the value of the peak width in the peak width numerical input/display field 2951 and the value of the baseline in the baseline numerical input/display field 2952, respectively. When the operator inputs one or both of these two values, the peak range setting unit 24 changes the both end positions of the peak and/or the position of the baseline. Here, the both end positions of the peak are the position indicated by the value obtained by adding the value of ½ of the input value of the peak width numerical input/display field 2951 to the value of m/z at the center of the peak as one end position, and the position indicated by the value obtained by subtracting the value of ½ of the input value from the value of m/z at the center of the peak as the other end position.

When the both end positions of the peak and/or the position of the baseline are set by the operation of the peak range setting unit 24 in this way, the area calculation unit 26 uses the set positions to calculate the area of the peak at the position in each standard specimen, and then the calibration curve creation unit 27 creates a calibration curve based on those areas and the concentration of each standard specimen, updates the calibration curve displayed in the calibration curve display region 292, and also the matching degree calculation unit 271 calculates the matching degree and updates the display of the matching degree.

Figure 5:
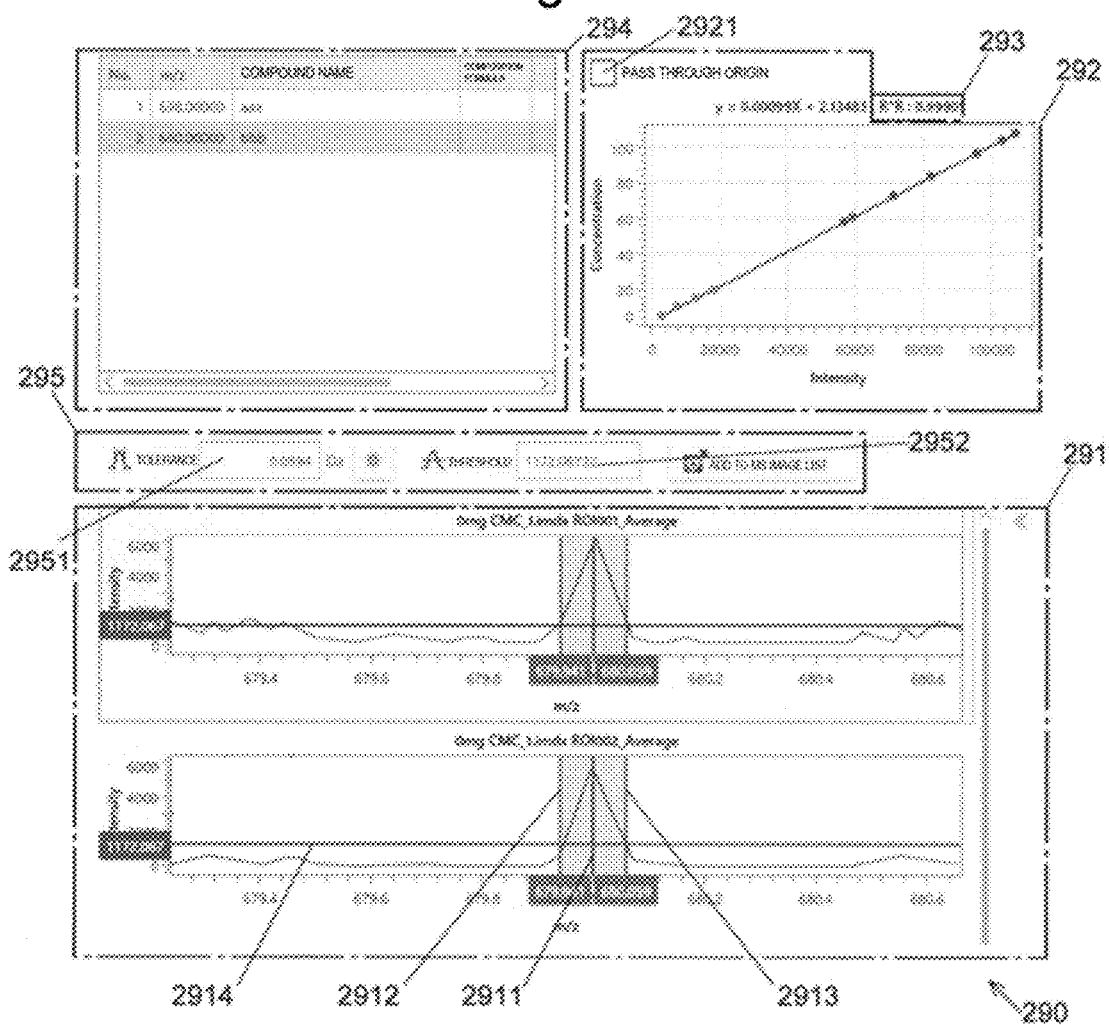
FIG. 5 is a figure showing an example of the calibration curve creation screen which is changed with the change of both end positions of a peak or a position of a baseline.
Figure 6A:
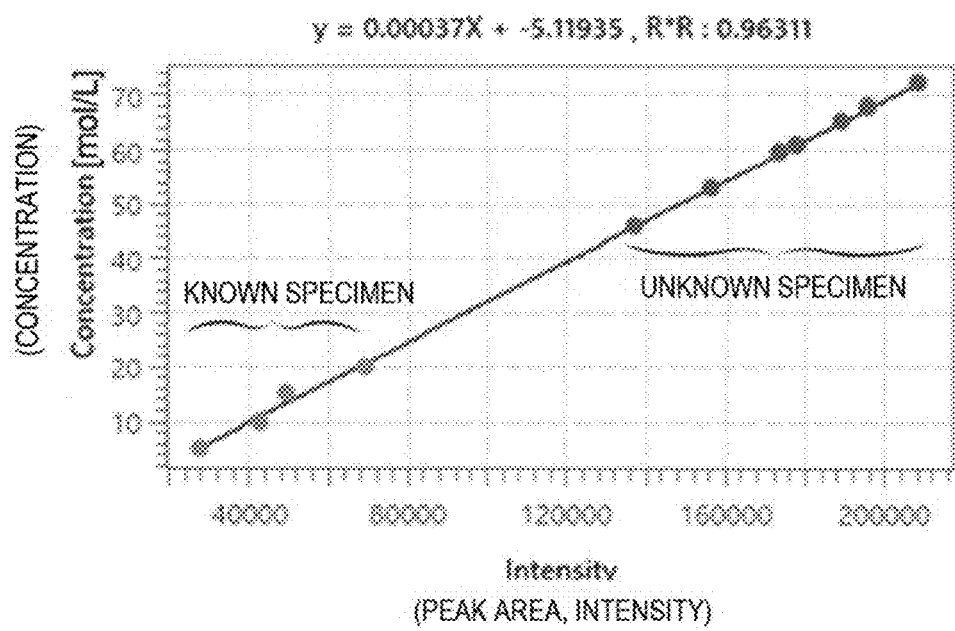
FIG. 6A is an enlarged view of a calibration curve and a matching degree before change of the both end positions of the peak or the position of the baseline.
Figure 6B:
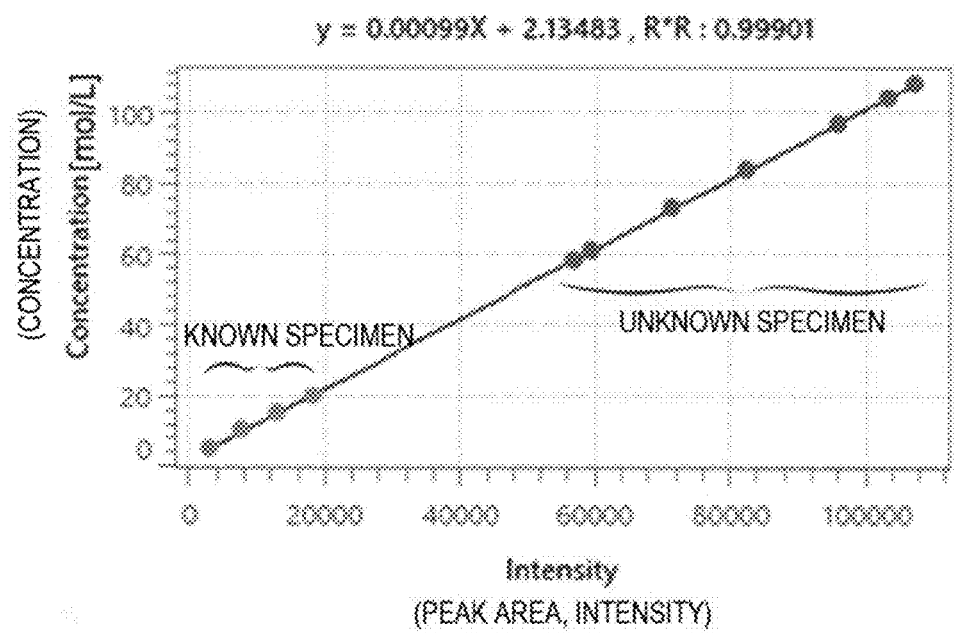
FIG. 6B is an enlarged view of a calibration curve and a matching degree after change of the both end positions of the peak or the position of the baseline.

For example, from the initial calibration curve creation screen 290 shown in FIG. 2, the positions of the both end position marks 2912 and 2913 and the baseline mark 2914 are changed as shown in FIG. 5, and the numerical values in the peak width numerical input/display field 2951 and the baseline numerical input/display field 2952 are updated accordingly, and the graph and function formula of the calibration curve and the matching degree ("R*R" in the figure) are also updated. FIGS. 6A and 6B show the calibration curve and the matching degree respectively before the update and after the update of the numerical values in the peak width numerical input/display field 2951 and the baseline numerical input/display field 2952 in an enlarged manner. The graphs of both calibration curves respectively show four points showing the relationship between the area value (intensity) and the concentration calculated for the standard specimens having different concentrations used for creation of the calibration curve. In addition, the component quantifying unit 28 calculates the intensity of the peak from the mass spectra obtained from different measurement points 43 in the unknown specimen using the both end positions of the peak and the position of the baseline, which are the same as when the calibration curve was created, and obtains the concentration of the target component at each measurement point 43 by applying the intensity to the created calibration curve. In the calibration curve display region 292, points (seven in the examples in FIGS. 2 and 5) representing the peak area (concentration) of the unknown specimen are shown. Comparing the calibration curve before and after the update, deviation of the points of the standard specimen from the calibration curve in appearance is smaller after the update than before the update. In fact, the matching degree value is closer to one after the update than before the update, indicating that the deviation of the points of the standard specimen from the calibration curve is smaller. The points of the unknown specimen are plotted at different concentration positions before and after the update, and it is considered that the concentration shown by the calibration curve after the update is more accurate than the matching degree of the calibration curve.

According to the mass spectrometer 1 and the data processing device 20 for the mass spectrometer of the present embodiment, the mass spectrum and the calibration curve are displayed on the calibration curve creation screen 290 of the same display unit 29, so that the operator can change the both end positions of the peak and the position of the baseline while seeing the calibration curve. In addition, the calibration curve is automatically updated each time the operator changes the both end positions of the peak and the position of the baseline, so it is not necessary to perform an operation to recreate the calibration curve each time the operator changes them. Therefore, the correct both end positions and baseline position can be easily set. Furthermore, when the operator sets the position of the both end position mark 2912 or 2913 or the baseline mark 2914 by moving the positions of them, the calibration curve display is updated moment by moment as the mark moves, so the operator can search for the optimum both end positions of the peak and baseline position while moving the mark, which makes it easier to set the positions.

FIG. 7 shows an example in which a distribution image 2900 showing the distribution of the concentration of a component in the specimen is displayed on the display unit 29 together with the calibration curve creation screen 290. The intra-specimen position information acquiring unit 2811 acquires the position information of the measurement point 43 in the specimen based on the optical image acquired by the image acquiring unit 12. In the distribution image 2900, a plurality of concentration display regions 2901 divided by being associated with minute regions obtained by dividing the region of interest 42 so that the measurement point 43 acquired by the intra-specimen position information acquiring unit 2811 is the center are displayed by the distribution image display controller 2812. Then, in each concentration display region 2901, the concentration quantified by the component quantifying unit 28 based on the mass spectrum obtained in the minute region in the specimen corresponding to the concentration display region 2901 is displayed in brightness. Instead of the brightness display, it may be displayed by different colors, or it may be displayed as a stereoscopic image with the concentration as the height. Alternatively, the numerical value of the concentration may be displayed in each concentration display region 2901.

While the calibration curve creation screen 290 and the distribution image 2900 are displayed, each time the operator changes the both end positions of the peak or the position of the baseline, the calibration curve is changed by the calibration curve creation unit 27. Accordingly, the concentration quantified based on the mass spectrum obtained in each minute region in the specimen is changed by the component quantifying unit 28. Then, the distribution image display controller 2812 changes the display of each concentration display region 2901 according to the changed concentration. As a result, the distribution image 2900 is automatically changed in response to the operator changing the both end positions of the peak or the position of the baseline.

Although some modifications have been described in the description of the above embodiments, the present invention is not limited to the above embodiments and the above modifications, and further modifications are possible within the scope of the gist of the present invention.

For example, in the above embodiment, mass spectrometry is performed using ions generated by irradiating a plurality of measurement points on the specimen surface with a laser beam, respectively, but instead, as described in Patent Literature 2, similar results can be obtained by performing mass spectrometry using ions generated by applying a voltage after bringing the probe into contact with each of the plurality of measurement points on the specimen surface. Further, the scope of application of the present invention is not limited to the case of performing mass spectrometry on a plurality of measurement points, and the present invention can also be applied to the case of performing one mass spectrometry on the entire specimen.

In the above embodiment, if the operator moves the position of both end position mark 2912 or 2913 or the baseline mark 2914, or inputs a numerical value in the peak width numerical input/display field 2951 or the baseline numerical input/display field 2952, the calibration curve is automatically updated, but after moving those positions or inputting a numerical value, the calibration curve may be updated when the "confirmation" button displayed on the screen is further depressed.

REFERENCE SIGNS LIST

1 . . . Mass Spectrometer (Analyzer)
10 . . . Mass Spectrometry Unit
11 . . . Specimen Table
111 . . . Ionization Chamber
112 . . . Vacuum Chamber
12 . . . Image Acquiring Unit
13 . . . Laser Irradiation Unit
15 . . . Ion Feed Unit
16 . . . Ion Guide
17 . . . Ion Trap
18 . . . Flight Tube
19 . . . Detector
20 . . . Data Processing Device for Mass Spectrometer (Spectrum Data Processing Device)
21 . . . Mass Spectrum Data Creation Unit (Spectrum Data creation unit)
22 . . . Mass Spectrum Data Storage Unit (Spectrum Data Storage Unit)
23 . . . Mass Spectrum Display Controller (Spectrum Display Controller)
24 . . . Peak Range Input Unit
25 . . . Peak Range Determination Unit
26 . . . Area calculation unit
27 . . . Calibration Curve Creation Unit
271 . . . Matching Degree Calculation Unit
28 . . . Component Quantifying Unit
29 . . . Display Unit
290 . . . Calibration Curve Creation Screen
291 . . . Mass Spectrum Display Region (Spectrum Display Region)
2911 . . . Center Position Mark
2912, 2913 . . . Both End Position Mark
2914 . . . Baseline Mark
292 . . . Calibration Curve Display Region
2921 . . . Check Box
293 . . . Matching Degree Display Region
294 . . . Data Display Region
295 . . . Peak Range Numerical Input/Display Region
2951 . . . Peak Width Numerical Input/Display Field
2952 . . . Baseline Numerical Input/Display Field
2900 . . . Distribution Image
2901 . . . Concentration Display Region
30 . . . Mass Spectrometry Controller
31 . . . Interest Region Setting Unit
32 . . . Measurement Point Setting Unit
33 . . . Analysis Condition Setting Unit
34 . . . Analysis Controller
41 . . . Specimen Plate
42 . . . Region of Interest
43 . . . Measurement Point
50 . . . Mass Spectrum Selection Screen
51 . . . Spectrum List
511 . . . Check Box
521, 522, 523 . . . Mass Spectrum

The invention claimed is:
1. A spectrum data processing device configured to create, based on a plurality of spectra each obtained from each of a plurality of specimens containing a predetermined compo- nent at known concentrations different from one another, a calibration curve showing a relationship between a concentration of the component in the specimen and an area of a peak corresponding to the component of a spectrum of the specimen, where each of the plurality of spectra has a peak top at a position depending on a component contained in a specimen, the spectrum data processing device comprising:
- a display configured to display a screen having a spectrum display region and a calibration curve display region; and
- a processor configured to:
- display one or more of the spectra in the spectrum display region;
- allow an operator to set both end positions of a peak or a position of a baseline corresponding to the component included in the displayed spectrum based on a position of a mark displayed on the spectrum and movable by an operation of an operator;
- determine the both end positions of the peak or the position of the baseline according to a predetermined standard;
- calculate an area of the peak based on the determined both end positions of the peak each time the both end positions of the peak are determined or based on the determined position of the baseline each time the position of the baseline is determined;
- create a calibration curve based on the calculated area of the peak and a known concentration of the peak; and
- display the calibration curve in the calibration curve display region.

2. The spectrum data processing device according to claim 1,
- wherein the display is further configured to display a screen having a matching degree display region for displaying a matching degree between the calculated area of the peak and a concentration corresponding to the calculated area of the peak, and the calibration curve, and
- the processor is further configured to calculate the matching degree and display the matching degree in the matching degree display region each time the calibration curve is created.

3. The spectrum data processing device according to claim 1, wherein the processor is further configured to display a mark on a peak corresponding to the component in a spectrum to be displayed in the spectrum display region.

4. The spectrum data processing device according to claim 1,
- wherein the display is further configured to display a screen having a distribution image display region for displaying a distribution of a concentration of the component obtained from a spectrum obtained at each of a plurality of positions in a specimen to be analyzed, and
- wherein the processor is further configured to:
- acquire, for the spectrum obtained at each of the plurality of positions, an intra-specimen position at which the spectrum is obtained;
- obtain a concentration of the component by applying the calculated area of the peak to a calibration curve for the spectrum obtained at each of the plurality positions each time the calibration curve is created; and
- display information on the concentration at a position in the distribution image display region corresponding to the position for the spectrum obtained at each of the plurality of positions each time the concentration is obtained.

5. An analyzer apparatus comprising:
- a) an analyzer configured to acquire a spectrum having a peak top at a position depending on a component contained in a specimen; and
- b) a spectrum data processing device that creates, based on a spectrum obtained by the analyzer from each of a plurality of specimens containing a predetermined component at known concentrations different from one another, a calibration curve showing a relationship between a concentration of the component in each specimen and an area of a peak corresponding to the component of the spectrum of the specimen, the spectrum data processing device including,
- a display configured to display a screen having a spectrum display region and a calibration curve display region, and
- a processor configured to:
- display one or more of the spectra in the spectrum display region,
- allow an operator to set both end positions of a peak or a position of a baseline corresponding to the component included in the displayed spectrum based on a position of a mark displayed on the spectrum and movable by an operation of an operator,
- determine the both end positions of the peak or the position of the baseline according to a predetermined standard,
- calculate an area of the peak based on the determined both end positions of the peak each time the both end positions of the peak are determined or based on the determined position of the baseline each time the position of the baseline is determined, and
- create a calibration curve based on the calculated area of the peak and a known concentration of the peak and display the calibration curve in the calibration curve display region.

6. A spectrum data processing method for creating, based on a plurality of spectra each obtained from each of a plurality of specimens containing a predetermined component at known concentrations different from one another, a calibration curve showing a relationship between a concentration of the component in the specimen and an area of a peak corresponding to the component of a spectrum of the specimen, where each of the plurality of spectra has a peak top at a position depending on a component contained in a specimen, the spectrum data processing method comprising:
- displaying one or more of the spectra in a spectrum display region in a screen of a display;
- allowing an operator to set both end positions of a peak or a position of a baseline corresponding to the component included in the displayed spectrum based on a position of a mark displayed on the spectrum and movable by an operation of an operator;
- determining the both end positions of the peak or the position of the baseline according to a predetermined standard;
- calculating an area of the peak based on the determined both end positions of the peak each time the both end positions of the peak are determined or based on the determined position of the baseline each time the position of the baseline is determined;
- creating a calibration curve based on the calculated area of the peak and a known concentration of the peak; and
- displaying the calibration curve in a calibration curve display region in the screen of the display.

* * * * *